(12) United States Patent
Cruz (10) Patent No.: US 8,136,890 B2
(45) Date of Patent: Mar. 20, 2012

(54) SHOCK PROOF DEVICES AND METHODS

(75) Inventor: Paul Cruz, San Diego, CA (US)

(73) Assignee: International Safety & Development, LLC, El Cajon, CA (US)

( * ) Notice: Subject to any disclaimer, the term of this patent is extended or adjusted under 35 U.S.C. 154(b) by 611 days.

(21) Appl. No.: 12/100,384

(22) Filed: Apr. 9, 2008

(65) Prior Publication Data

US 2009/0251839 A1    Oct. 8, 2009

Related U.S. Application Data

(60) Provisional application No. 61/041,895, filed on Apr. 2, 2008.

(51) Int. Cl.
  *H02B 1/34* (2006.01)
  *H01H 35/00* (2006.01)
  *H01H 83/00* (2006.01)
  *H01H 47/00* (2006.01)
  *H02H 3/00* (2006.01)

(52) U.S. Cl. ........... 301/131; 361/42; 361/49; 361/78; 361/79; 361/87; 335/78

(58) Field of Classification Search .......... 307/70, 307/72–76, 85–87; 361/210
See application file for complete search history.

(56) References Cited

U.S. PATENT DOCUMENTS

| | | | |
|---|---|---|---|
| 2,789,255 A | 4/1957 | Mekler | |
| 2,810,894 A | 10/1957 | Kerr | |
| 2,937,322 A | 5/1960 | Nixon | |
| 3,115,874 A | 12/1963 | Roberts | |
| 3,158,791 A * | 11/1964 | Deneen, Jr. et al. | 361/155 |
| 3,184,651 A * | 5/1965 | Albosta | 361/210 |
| 3,280,375 A | 10/1966 | Jensen | |
| 3,524,133 A | 8/1970 | Arndt | |
| 3,525,903 A | 8/1970 | Morris et al. | |
| 3,621,334 A | 11/1971 | Burns et al. | |
| 3,654,515 A | 4/1972 | Kato et al. | |

(Continued)

FOREIGN PATENT DOCUMENTS

DE    38 44 176 A1    7/1990

(Continued)

OTHER PUBLICATIONS

International Search Report dated Jun. 29, 2007 for International Patent Application No. PCT/US2006/039559.

(Continued)

*Primary Examiner* — Jared Fureman
*Assistant Examiner* — Justen Fauth
(74) *Attorney, Agent, or Firm* — Knobbe Martens Olson & Bear LLP (57) ABSTRACT

Devices and methods for preventing shock from a high voltage power source. In one embodiment, a device for preventing an electric shock, comprises output terminals for connecting to an external load, a low voltage circuit for carrying a first current ($I_L$) to the output terminals, the low voltage circuit comprising a first coil disposed about a magnetic core, and a high voltage circuit for carrying a second current ($I_H$) to the output terminals, the high voltage circuit comprising a second coil disposed about the magnetic core, and a control relay configured to electrically connect one of the high voltage circuit and the low voltage circuit to the output terminals based at least partly on the first current ($I_L$).

15 Claims, 6 Drawing Sheets

U.S. PATENT DOCUMENTS

| | | | |
|---|---|---|---|
| 3,676,738 | A | 7/1972 | Scanlan |
| 3,727,106 | A | 4/1973 | Mendel et al. |
| 3,866,197 | A | 2/1975 | Schweitzer, Jr. |
| 3,870,928 | A | 3/1975 | Allen |
| 3,886,434 | A | 5/1975 | Schreiner |
| 3,974,446 | A | 8/1976 | Schweitzer, Jr. |
| 3,991,366 | A | 11/1976 | Schweitzer, Jr. |
| 4,034,360 | A | 7/1977 | Schweitzer, Jr. |
| 4,042,967 | A | 8/1977 | Yamamoto |
| 4,064,546 | A | 12/1977 | Domanski |
| 4,077,056 | A | 2/1978 | Galiana |
| 4,255,773 | A | 3/1981 | Jabbal |
| 4,360,740 | A * | 11/1982 | Conard ............ 307/134 |
| 4,410,925 | A | 10/1983 | Tucker et al. |
| 4,414,543 | A | 11/1983 | Schweitzer, Jr. |
| 4,447,844 | A | 5/1984 | Schossow et al. |
| 4,706,153 | A | 11/1987 | Sainomoto et al. |
| 4,853,821 | A | 8/1989 | Lewis |
| 4,888,660 | A | 12/1989 | Bartelink |
| 4,947,278 | A | 8/1990 | Nichols, III |
| 4,948,044 | A | 8/1990 | Cacciatore |
| 5,003,486 | A | 3/1991 | Hendel et al. |
| 5,019,935 | A | 5/1991 | Nakamura |
| 5,069,632 | A | 12/1991 | Avitan |
| 5,151,841 | A | 9/1992 | Knights |
| 5,267,116 | A | 11/1993 | Avitan |
| 5,347,095 | A | 9/1994 | Zeder |
| 5,426,552 | A | 6/1995 | Avitan |
| 5,485,340 | A | 1/1996 | Avitan |
| 5,737,161 | A | 4/1998 | Thomas |
| 5,892,644 | A | 4/1999 | Evans et al. |
| 5,920,452 | A | 7/1999 | Sullivan |
| 5,923,514 | A | 7/1999 | Scott et al. |
| 5,946,180 | A | 8/1999 | Simpson |
| 5,988,516 | A | 11/1999 | Gilmour |
| 6,049,143 | A | 4/2000 | Simpson et al. |
| 6,094,330 | A | 7/2000 | Criniti et al. |
| 6,100,607 | A | 8/2000 | Olivieri et al. |
| 6,118,639 | A * | 9/2000 | Goldstein ............ 361/55 |
| 6,307,482 | B1 | 10/2001 | Le Bel |
| 6,548,916 | B1 * | 4/2003 | Kanazawa et al. ............ 307/85 |
| 6,552,888 | B2 | 4/2003 | Weinberger |
| 6,710,587 | B1 | 3/2004 | Reynoso et al. |
| 6,717,781 | B2 | 4/2004 | Xu et al. |
| 6,749,456 | B1 | 6/2004 | Conner et al. |
| 6,829,124 | B2 | 12/2004 | Leopold et al. |
| 6,891,454 | B1 | 5/2005 | Naito et al. |
| 6,957,910 | B1 | 10/2005 | Wan et al. |
| 7,009,859 | B2 * | 3/2006 | Chen et al. ............ 363/65 |
| 7,224,086 | B2 | 5/2007 | Germagian et al. |
| 7,400,476 | B1 | 7/2008 | Hull, Jr. |
| 7,505,237 | B2 | 3/2009 | Baxter |
| 7,928,609 | B2 | 4/2011 | Cruz |
| 2002/0097546 | A1 | 7/2002 | Weinberger |
| 2002/0154461 | A1 * | 10/2002 | Chapman et al. ............ 361/42 |
| 2003/0007302 | A1 | 1/2003 | Gerfast |
| 2005/0128043 | A1 | 6/2005 | Ying |
| 2005/0131552 | A1 | 6/2005 | Yuan |
| 2006/0232366 | A1 | 10/2006 | Li |
| 2008/0049367 | A1 | 2/2008 | Carson et al. |
| 2009/0225480 | A1 | 9/2009 | Baxter |

FOREIGN PATENT DOCUMENTS

| | | |
|---|---|---|
| EP | 0 348 128 A | 12/1989 |
| EP | 0 384 881 | 8/1990 |
| EP | 0683927 | 11/1995 |
| JP | 2006/296111 | 10/2006 |
| WO | WO 93/09634 | 5/1993 |
| WO | WO 94/17573 | 8/1994 |
| WO | WO 2008/082636 A1 | 12/2007 |

OTHER PUBLICATIONS

International Search Report and Written Opinion of the International Searching Authority dated Aug. 5, 2009 for International Patent Application No. PCT/US2009/039210 filed Apr. 1, 2009.

* cited by examiner

SHOCK PROOF DEVICES AND METHODS

RELATED APPLICATIONS

This application claims the benefit of U.S. Provisional No. 61/041,895, filed Apr. 2, 2008.

BACKGROUND OF THE INVENTION

1. Field of the Invention

This invention relates generally to shock-proof electrical output devices and methods, and more particularly to shock-proof electrical output devices and methods that distinguish between an actual electrical load and a false load created by living beings in contact with the output of a device, a high voltage being applied at the output only when an actual electrical load is present at the output.

2. Background

Electrical receptacle outlets in walls and floors present serious hazards to the public. The U.S. Consumer Product Safety Commission (CPSC) estimates that 3,900 injuries associated with electrical receptacle outlets are treated in hospital each year. Approximately one third of these injuries occur when young children insert metal objects, such as hair pins and keys, into the outlet, resulting in electric shock or burn injuries to the hands or fingers, and, in many instances, death. The CPSC also estimates that electrical receptacles are involved in 5,300 fires annually, which claim, on average, 40 lives and injure 110 consumers. Thus, there is a need to develop a cost-effective and compact shock proof device that can prevent electrical shock-related injuries to humans.

SUMMARY OF CERTAIN INVENTIVE ASPECTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over shock preventive devices and methods.

In one embodiment, a device for preventing an electric shock, the device includes output terminals for connecting to an external load, a low voltage circuit for carrying a first current ($I_L$) to the output terminals, the low voltage circuit comprising a first coil disposed about a magnetic core, a high voltage circuit for carrying a second current ($I_H$) to the output terminals, the high voltage circuit comprising a second coil disposed about the magnetic core; and a control relay configured to electrically connect one of the high voltage circuit and the low voltage circuit to the output terminals based at least partly on the first current ($I_L$). The control relay can include a default state and an energized state, and wherein the low voltage circuit is connected to the output terminals in the default state and the high voltage circuit is connected to the output terminals in the energized state. The control relay can be configured to switch from the default state to the energized state when a magnetic field produced by the magnetic core due to the $I_L$ current flowing in the first coil equals or exceeds a threshold magnetic field, and in some aspects the magnetic field exceeds the threshold magnetic field when the magnitude of the $I_L$ current equals to or exceeds a low voltage current threshold value. In another aspect, the control relay remains in the energized state while a magnetic filed produced by the magnetic core due to the $I_H$ current flowing in the second coil equals to or exceeds a threshold magnetic field. The device can further include a second low voltage circuit configured to carry a third current $I_H$ and provide an assistive magnetic field that is added to the magnetic field due to the $I_H$ current.

In another embodiment, a device for preventing an electric shock, the device includes a low voltage source, high voltage input terminals for connecting to a high voltage source, a power outlet comprising a positive a pair of output terminals for providing either a low voltage current ($I_L$) or a high voltage current ($I_H$) to an external electrical load, and a control relay for selectively providing power from one of the low voltage and the high voltage to the power outlet, wherein the control relay comprises a low voltage coil configured to carry the $I_L$ current and a high voltage coil configured to carry the $I_H$ current. In one aspect, the low voltage source is configured to provide a low DC voltage in the range between about 1 mV to about 30V. In another aspect, the low voltage source is configured to provide a low AC voltage in the range between about 1 mVrms to about 30Vrms. In another aspect, the high voltage source provides an AC voltage in the range of about 30Vrms to about 500 Vrms. In another aspect, the high voltage source provides an AC voltage in the range of about 500Vrms to about 10,000 Vrms. In another aspect, the low voltage source comprises a step-down transformer. Further, the control relay can include a default state and an energized state, and wherein low voltage is provided in the default state and high voltage is provided in the energized state. Also, the control relay can switch from the default state to the energized state when a magnetic field produced by the magnetic core due to the $I_L$ current flowing in the low voltage coil equals or exceeds a threshold magnetic field. In another aspect, the magnetic field exceeds the threshold magnetic field when the magnitude of the $I_L$ current equals to or exceeds a low voltage current threshold value. In another aspect, the control relay switches from the default state to the energized state when an external electrical load having a load impedance ($Z_L$) that is less than a threshold impedance is connected to the power outlet. The threshold impedance can be between about 500Ω and about 10 kΩ, or between about 10 kΩ and about 100 kΩ. In another aspect, the control relay remains in the energized state while a magnetic filed produced by the magnetic core due to the $I_H$ current flowing in the high voltage coil equals to or exceeds a threshold magnetic field. The control relay can further include a magnetic core that is disposed within the high voltage coil and the low voltage coil, a lever system comprising a support frame disposed with respect to at least one of the low voltage coil and the high voltage coil, a pivot connected to the support frame, a metallic strip rotatably connected to the pivot, the metallic strip having a first side and a second side, and a common contact disposed on the metallic strip, a high voltage contact disposed on the first side of the metallic strip, and a low voltage contact disposed on the second side of the metallic strip. The magnetic core can comprise a soft magnetic material. In another aspect, the metallic strip is a bimetallic strip that is configured to convert a temperature change into a mechanical displacement. In another aspect, the pivot comprises a spring that is configured to apply a torque on the metallic strip such that the common contact makes an electrical contact with the low voltage contact in the default state. In another aspect, switching from the default state to the energized state occurs when a magnetic field produced the magnetic core due to the $I_L$ current flowing in the low voltage coil exerts an attractive force between the magnetic core and the metallic strip strong enough to overcome the torque provided by the spring. The device can further include a secondary low voltage coil that is configured to carry a secondary low voltage current and provide an assistive magnetic field that is added to a magnetic field due to the $I_H$ current.

DETAILED DESCRIPTION OF CERTAIN INVENTIVE EMBODIMENTS

Certain embodiments provide a system and method for preventing electrical shock.

The following detailed description is directed to certain sample embodiments of the invention. However, the invention can be embodied in a multitude of different ways as defined and covered by the claims. In this description, reference is made to the drawings wherein like parts are designated with like numerals throughout.

Shock Proof Device

Figure 1:
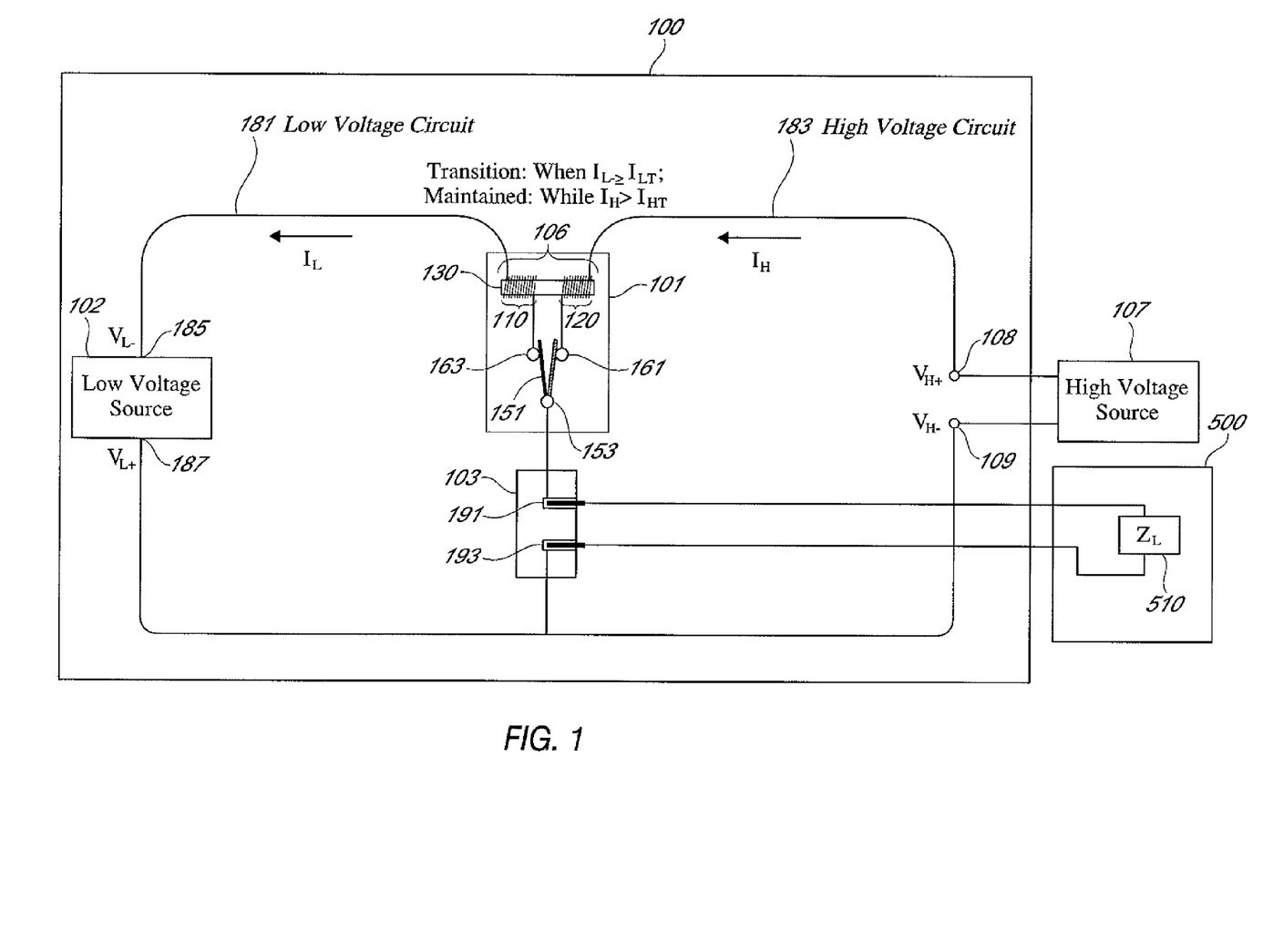
FIG. 1 shows a block diagram illustrating a shock proof device according to certain embodiments.

Exemplary implementations of various embodiments of a shock proof device are described herein. FIG. 1 shows a block diagram illustrating a shock proof device 100 according to certain embodiments. The device 100 comprises a control relay 101, a low voltage source 102, a power outlet 103, and high voltage inputs 108, 109 connected to a high voltage source 107. The control relay 101 includes a switching coil system 106, a common contact 153, a high voltage contact 161, a low voltage contact 163, and a metallic strip 151. The switching coil system 106 includes a low voltage coil (LVC) 110, a high voltage coil (HVC) 120, a magnetic core 130. The low voltage source includes a negative low voltage ($V_{L-}$) terminal 185 and a positive low voltage ($V_{L+}$) terminal 187. The power outlet 103 includes a positive output terminal 191 and a negative output terminal 193. The high voltage inputs 108, 109 include a positive or "hot" ($V_{H+}$) terminal 108 and a negative or neutral ($V_{H-}$) terminal 109.

In certain embodiments, the low voltage source 102 receives power from the high voltage source 107. The low voltage source 102 can include a step-down transformer configured to provide a low AC voltage of a known ratio (e.g., 20:1) of the high voltage input. In some of those embodiments including the step-down transformer, the low voltage source 102 can further include one or more diodes for rectifying the low AC output voltage into a DC voltage. In other embodiments, the low voltage source 102 includes one or more batteries. In yet other embodiments, the low voltage source 102 can include a high frequency signal source such as a radio frequency generator.

In certain embodiments, the power outlet 103 can be in the form of household electrical receptacles, for example, those providing 125 or 230 VAC power to household appliances, for example. In other embodiments, the power outlet 103 can be in the form of an electrical contactor found in industrial plants for providing 230 or 460V power to electrical machineries. In some embodiments, the high voltage can be as high as 10,000Vrms. The particular form that the power outlet 103 takes, of course, depends largely on the application.

In certain embodiments, the switching coil system 106 includes one common magnetic core 130 about which both the low voltage coil (LVC) 110 and the high voltage coil (HVC) 120 are disposed. In other embodiments, the switching coil system 106 can include two magnetic cores about which the LVC 110 and the HVC 120 are separately disposed. In some embodiments, the LVC and/or HVC 110, 120 are wound directly on the same magnetic core 130. In other embodiments, the LVC and/or HVC 110, 120 are pre-formed and placed around the magnetic core 130. In certain embodiments, the magnetic core 130 includes a high permeability metal such as soft iron or steel. In some embodiments, the magnetic core 130 is stationary and configured to attract the metal strip 151 that is mechanically and electrically connected to the common contact 153. In other embodiments, the switching coil system 106 may not include a magnetic core, and, instead, relies on a free-air magnetic field generated by the LVC or the HVC to attract the metal strip 151. In yet other embodiments (not shown), the magnetic core 130 is not stationary and configured to move up or down when at least one of the low and high voltage coils 110, 120 is energized, and physically pushes on the metal strip 151 to move the metal strip 151 from the low voltage contact 163 to the high voltage contact 161. In yet other embodiments, the metallic strip is a flexible membrane fixedly supported at least on one end that can be deflected by the magnetic field produced by the magnetic core so that the common contact disposed on the metallic strip can contact the high voltage contact when the metallic strip is deflected. Various components of the control relay 101 including the switching coil system 106 will be described in detail with reference to FIG. 3 below.

The low voltage contact 163 of the control relay 101 is connected to the $V_{L-}$ terminal 185 of the low voltage source 102, and the high voltage contact 161 of the control relay 101 is connected to the $V_{H+}$ terminal 108. The common contact 153 is connected to the positive output terminal 191 of the power outlet 103. The negative output terminal 193 of the power outlet 103 is connected to the $V_{L+}$ terminal 187 of the low voltage source 102.

The high voltage inputs 108, 109 can be connected to an external high voltage source, e.g., 110VAC outlet. An external electrical load 500, e.g., an appliance, power tool, vacuum, can be connected (e.g., plugged or wired) into the power outlet 103 of the shock proof device 100. The external electrical load 500 has a load impedance ($Z_L$) 510 which, in general, includes a real component R and an imaginary component X. When the external electrical load 500 is connected to the power outlet 103, the device 100 "sees" the load impedance ($Z_L$) 510.

The control relay 101 can be thought of as a single-pole-double-throw (SPDT) relay with the common terminal corresponding to the common contact 153, a normally-closed (NC) terminal corresponding to the low voltage contact 163, and a normally-open (NO) terminal corresponding to the high voltage contact 161. The control relay is controlled by magnitudes of $I_L$ and $I_H$ flowing through the normally-closed contact and the normally-open contact, respectively. The control relay 101 is in its default state, in which the common contact 153 is in a mechanical and electrical contact with the low voltage contact 163, when one of the following conditions exists: (a) no external electrical load 500 is present, e.g., the output terminals 191, 193 are open; (b) there is an external electrical load 500, but its load impedance ($Z_L$) exceeds a certain threshold load impedance ($Z_T$) such that the $I_L$ stays below a certain threshold low voltage current ($I_{L-TH}$); and (c) the low voltage source is not powered, because the shock proof device 100, for example, is not connected to a high voltage source, which provides power to the low voltage source in some embodiments.

It is important to note that the condition (a) (no external electrical load) also encompasses the condition in which a human body part is in contact with one or both terminals 191, 193 of the power outlet 103. The impedance presented by human body can depend on internal impedance and impedance of skin. The internal impedance can depend on a variety of factors including current path and surface area of contact. The impedance of skin can also depend on a variety of factors including voltage, frequency, length of time, surface area of contact, pressure of contact, temperature, and amount of moisture. In certain embodiments, the threshold load impedance (ZT) is between about 500Ω and about 10 kΩ. In other embodiments, the ZT impedance is between about 10 kΩ and about 100 kΩ. It will be appreciated that the threshold load impedance below which the relay switches from the low voltage configuration to the high voltage configuration is a design parameter that can be selected depending on the application.

When an external electrical load 500 with $Z_L \leq Z_T$ is connected to the device 100 such that the $I_L \geq I_{L-TH}$ condition is satisfied, the control relay 101 switches to its energized state, where the common contact 153 comes into a mechanical and electrical contact with the high voltage contact 161, thereby connecting the $V_{H+}$ terminal 108 to the positive output terminal 191 and allowing a high voltage current ($I_H$) to flow through the load impedance 510 of the external electrical load 500. Henceforth, this condition for switching from the low voltage contact 163 to the high voltage contact 161 will be referred to as the "L-H switching condition" The connection between the common contact 153 and the high voltage contact 161 is maintained while the high voltage current $I_H$ stays above a certain threshold value $I_{H-TH}(I_H \geq I_{H-TH})$. Henceforth, this condition for maintaining the switch at the high voltage contact 161 will be referred to as the "H maintenance condition."

The shock proof device 100 can include: 1) a low voltage circuit 181 comprising the NC contacts (e.g., between the common contact 153 and the low voltage contact 163) and the load impedance $Z_L$ 510; and 2) a high voltage circuit 183 comprising the NO contacts (e.g., between the common contact 153 and the high voltage contact 161) and the and the load impedance $Z_L$ 510. In terms of this dual circuit framework, the $I_L$ flowing in the low voltage circuit 181 through the load impedance 510 is driven by the low voltage source 102, while the $I_H$ flowing in the high voltage circuit 183 through the load impedance 510 is driven by the high voltage source 107. The positive output terminal 191 of the shock proof device 100 receives the negative low voltage ($V_{L-}$) when the L-H switching condition (e.g., $I_L \geq I_{L-TH}$) is not satisfied. This can occur, for example, when there is no load or a high impedance load connected to the power outlet, or when a proper low voltage is not present at the low voltage source 102. A human body typically represents a high impedance path. Therefore, under most conditions (e.g., wet), a human body touching the power outlet 103 would fail to draw a low voltage current ($I_L$) sufficient enough to cause the common contact 153 to switch from its default connection to the low voltage contact 163 to the high voltage contact 161. On the other hand, when an external electrical load 500 is connected to the power outlet 103, the requisite $I_L \geq I_{L-TH}$ condition is satisfied under most circumstances, thereby causing the common contact 153 to switch from the low voltage contact 163 to the high voltage contact 161.

Figure 2:
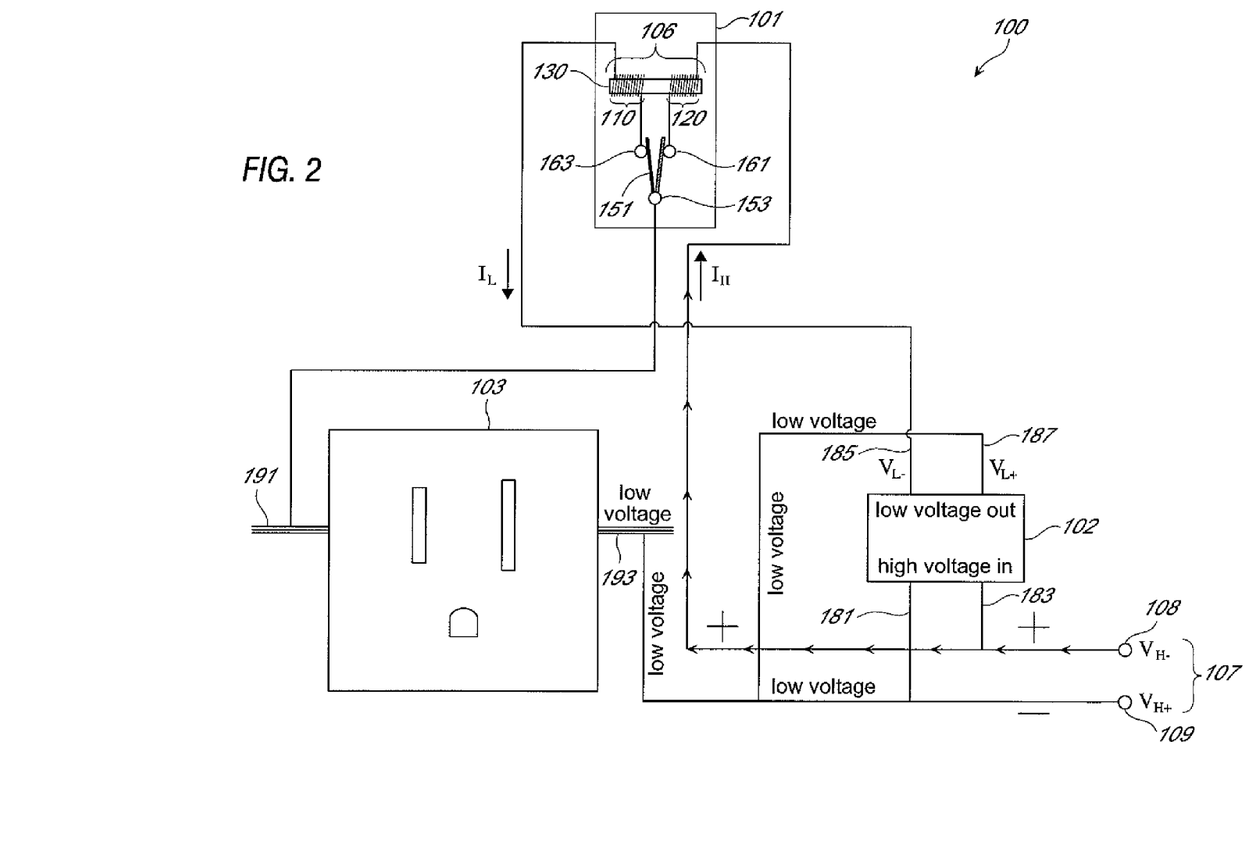
FIG. 2 shows another block diagram illustrating an example of a shock proof electrical receptacle as an embodiment of the shock proof device such as the one shown in FIG. 1.

FIG. 2 shows another block diagram illustrating an example of a shock proof electrical receptacle 200. Components of the shock proof electrical receptacle 200 can be substantially the same as those of the shock proof device 100 illustrated in FIG. 1, and, thus, descriptions of those components given above also apply here. Special and/or additional features of the particular embodiment shown in FIG. 2 will be described here. The power outlet 103 can be in the form of an electrical receptacle providing a single-phase electrical power. The power outlet 103 shown can be the grounded 3-pin 125V receptacle commonly found in North America, the ungrounded 2-pin 125V receptacle also found in North America, or the European style 2-pin 250V receptacle commonly found in Europe and parts of Asia. In the particular embodiment shown, the low voltage source 102 gets its power from the high voltage source 107 by having its input terminals 183 and 181 connected to $V_{H+}$ and $V_{H-}$, respectively. In certain embodiments, the low voltage output of the low voltage source 102 is a low DC voltage in the range between about 1 mV to about 30V. In other embodiments, the low voltage output can be a low AC voltage in the range between about 1 mVrms and about $30V_{rms}$. In yet other embodiments, the low voltage output can be a high frequency, e.g., radio frequency, signal.

Figure 3:
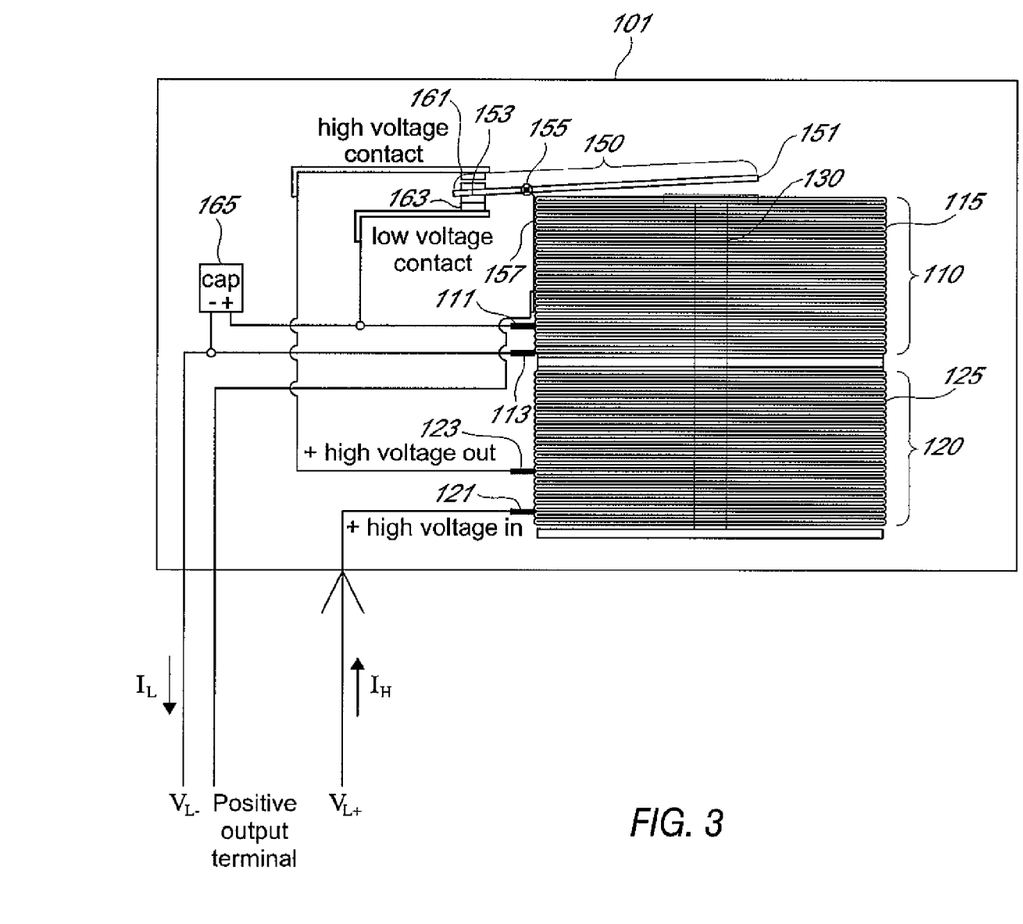
FIG. 3 shows a schematic diagram illustrating an embodiment of the control relay that can be used in various embodiments of the shock proof device such as the ones shown in FIGS. 1 and 2.

FIG. 3 shows a schematic diagram illustrating an embodiment of the control relay 101 that can be used in various embodiments of the shock proof device such as the ones shown in FIGS. 1 and 2. The control relay 101 comprises a low voltage coil (LVC) 110, a high voltage coil (HVC) 120, a magnetic core 130 disposed within the low voltage coil 110 and the high voltage coil 120, a lever system 150, a high voltage contact 161, and a low voltage contact 163. The low voltage coil (LVC) 110 includes a LVC input 111, a LVC output 113, and a LVC winding 115. The high voltage coil (HVC) 120 includes a HVC input 121, a HVC output 123, and a HVC winding 125. The lever system 150 includes a metallic strip 151, a common contact 153, a pivot 155, and a support frame 157. The control relay 101 further includes a delay capacitor 165. In some embodiments, the switching coil system 106 shown in FIGS. 1 and 2 can comprise the LVC 110, the HVC 120, and the magnetic core 130.

The magnetic core 130 can include one or more soft magnetic materials that become magnetized when either the LVC 110 or the HVC 120 is energized by a current flowing in the coil. As used herein, the term "soft magnetic material" refers to a ferromagnetic material that loses its memory of previous magnetization that is commonly used in electromagnets to multiply (often hundreds or thousands of times) the magnetic field of a wire that carries an electrical current. The soft magnetic material can include, but is not limited to, one or more of crystalline ferromagnetic materials such as cobalt, iron, $FeOFe_2O_3$, $NiOFe_2O_3$, $CuOFe_{e2}O_3$, $MgOFe_2O_3$, MnBi, Ni, MnSb, $MnOFe_2O_3$, $Y_3Fe_5O_{12}$, $CrO_2$, MnAs, and Gd. The soft material can also include one or more of non-crystalline ferromagnetic alloys, e.g., Metglas®, created by vary rapid quenching of a liquid alloy such as comprising iron and boron. In some embodiments, the magnetic core 130 extends outside the top edge of the upper coil 110 as shown in FIG. 3 so that it can be positioned closer to the lower surface of the metallic strip 151. In other embodiments, the top or "head" portion of the magnetic core (the portion closest to the magnetic strip 151) has a greater diameter than the remaining part of the magnetic core 130 such as to increase the net attractive force applied on the metallic strip 151.

In the particular embodiment shown in FIG. 3, the lever system 150 is configured to provide a relay switching from a normally closed (NC) position to a normally open (NO) position when the magnetic core 130 produces a magnetic field (B) that exceeds a threshold magnetic field ($B_T$). This condition ($B > B_T$) is met when the L–H switching condition is met. In other words, $I_{L-TH}$ can be thought of as the amount of current that will generate $B_T$, When this happens, the attractive force between the magnetic core 130 and the metallic strip 151 causes the relay switching. The lever system 150, therefore, has two states: a default state and an energized state. The lever system 150 is in the default state when neither the LVC 110 nor the HVC 120 is sufficiently energized. A spring (not shown) incorporated in the pivot 155 provides a counterclockwise torque on the metallic strip 151 towards the support frame 157, thereby causing the common contact 153 to mechanically contact the low voltage contact 163 and make an electrical contact with the same. This default state corresponds to the default state of the SPDT relay discussed above. The lever system 150 goes to the energized state, when the L–H switching condition ($I_L \geq I_{L-TH}$) is satisfied, the LVC 110 is sufficiently energized, and the magnetic core 130 produces a magnetic field that exceeds $B_T$. In that case, a clockwise torque produced by an attractive force between the metallic strip 151 and the magnetic core 130 overcomes the counterclockwise torque provided by the spring in the pivot 155, thereby causing the common contact 153 to make an electrical and mechanical contact with the high voltage contact 161. This energized state corresponds to the energized state of the SPDT relay. The lever system 150 remains in the rotated state while the H maintenance condition (($I_H \geq I_{H-TH}$) is satisfied.

The delay capacitor 165 is configured to provide reliable relay switching. In the absence of the delay capacitor, as the lever system 140 makes a transition from the default state to the energized state, there exists a short switching time, between when IL ceases to flow in the low voltage circuit 181 (FIG. 1) and when a sufficient $I_H$ flows in the high voltage circuit 183 (FIG. 1), during which neither the LVC 110 nor the HVC 120 is sufficiently energized. During this switching time, there can be an interruption in the attractive force between the magnetic core 130 and the metallic strip 151. Depending on the length of the switching time, this interruption can cause the lever system 140 to return to the default state, where again the LVC is energized and the magnetic core 130 exerts an attractive force on the metallic strip 151. This can lead to an undesirable mechanical toggling or oscillation. The delay capacitor 165, which is charged before the switching, can provide a reserve of charges that can continue to supply $I_L$ current during the switching time until a sufficient $I_H$ develops in the newly established high voltage circuit. Note that the positive lead and the negative lead of the delay capacitor 165 are connected to the LVC input 111 and the LVC output 113, respectively. The choice of the capacitance for the delay capacitor depends on the desired delay time and the intrinsic resistance of the coil that it is connected to. In certain embodiments where the intrinsic resistance of the LVC was about 10Ω, 2000 μF delay capacitance was used. In other embodiments where the intrinsic resistance was about 300Ω, 5 μF delay capacitance was sufficient. In certain embodiments, the metallic strip 151 comprises a bimetallic strip that is configured to convert a temperature change into a mechanical displacement so as to function as a fuse.

The choices for the number of windings for the LVC coil 115, $N_{LVC}$, and the number of windings for the HVC winding 125, $N_{HVC}$, depend on various factors such as the current rating of the shock proof device 100, the ratio of the high voltage to the low voltage, the effective permeability of the magnetic core, the restorative torque of the spring in the pivot 155, the magnetic properties of the metallic strip 151, the length of the lever between the pivot and where the magnetic attractive force is applied, and the relative positions of the LVC 110 and the HVC 120. The thickness of the HVC winding, of course, depends on the current rating of the device 100.

In certain embodiments, the LVC 110 is positioned on top of the HVC 120 so as to be closer to the lever system 150 as shown in FIG. 3. In other embodiments, the HVC 120 is positioned on top of the LVC 110. In yet other embodiments, the LVC 110 is wound or positioned closer to the magnetic core 130 and the HVC 120 is wound or positioned outside the LVC 110. In yet other embodiments, the HVC 120 is wound or positioned closer to the magnetic core 130 and the LVC 110 is wound or positioned outside the LVC 110. In yet other embodiments, the control relay 101 is filled with oil (for example, a mineral oil or methylsterate) to prevent or reduce electrical sparks and welding of contacts, and extend the usable life time of the relay.

With references to FIGS. 1, 2 and 3, the operation of the shock proof device 100 will be described with respect the voltage potential of the positive output terminal 191 in different possible situations. When the device 100 is not connected to a high voltage source, there is no current flowing through the high voltage circuit 183 or the low voltage circuit 181. Therefore, neither the LVC 110 nor the HVC 120 is energized. Consequently, the magnetic core 130 is not magnetized; the common contact 153, which is connected to the positive output terminal 191 of the power outlet 103, is connected to the low voltage contact 163. With no high voltage present, the positive output terminal 191 is not "hot."

In operation, the device 100 may be connected to a high voltage source 107, but no load is connected to the power outlet 103. The low voltage source 102 receives the $V_{H+}$ and the $V_{H-}$ from the high voltage source 107 and produces a low voltage comprising $V_{L+}$ and $V_{L-}$. However, there is no $I_L$ current flowing through the low voltage circuit because an electrical open exists between the positive output terminal 191 and the negative terminal 193. Therefore, the LVC 110 is not energized. Also, with an electrical open existing between the common contact 153 and the high voltage contact 161, there is no $I_H$ current flowing through the high voltage circuit Therefore, the HVC 120 is also not energized. With the LVC 110 and the HVC 120 un-energized, the magnetic core 130 does not attract the metallic strip 151 to cause the relay switching. Consequently, the positive output terminal 191 is at the $V_{L+}$ voltage level, and, therefore, not "hot."

Now suppose that the device 100 is connected to a high voltage source, but no load is connected to the power outlet, but a human body part is touching one or both of the output terminals 191 and 193. As discussed above, a human skin presents a very high impedance path between the positive output terminal 191 and the negative output terminal 193. Consequently, the device 100 can be configured such that $I_L$ current flowing in the low voltage circuit through the human body will not meet the L-H switching condition and cause the relay switching. Therefore, the positive output terminal 191 remains at the $V_{L+}$ voltage level, and, therefore, not "hot."

Now suppose that the device 100 is connected to the high voltage source and an external load 500 is connected to the power outlet 103. Assuming that the load impedance ($Z_L$) 510 of the external load is below the threshold impedance $Z_T$, a sufficiently high $I_L$ current can flow in the low voltage circuit via the LVC 110 so as to cause the magnetic core 130 to attract and rotate the metallic strip 151. During this rotation, the common contact 153 loses an existing mechanical and electrical contact with the low voltage contact 161 and establishes a new mechanical and electrical contact with the high voltage contact 163. When this happens, the $I_L$ stops flowing in the low voltage circuit, and the $I_H$ starts to flow in the high voltage circuit, thereby maintaining the control relay 100 in its energized state. From this point on, high voltage is supplied to the outlet until the external load is turned off or unplugged from the outlet, at which time the control relay switches from the energized state to the default state because there is no $I_H$ current for the magnetic core 130 attract the metallic strip 151 and maintain the control relay in the energized state.

Low Voltage Assisted Shock Proof Device

In certain cases, it is desirable to minimize $N_{HVC}$, the total number of HVC coil windings. This is especially true when the current rating of the shock proof device is high such that it is necessary to use a relatively thick wire for the HVC winding. The HVC can become bulky and harder to manufacture. In addition to accommodate the bigger HVC, the shock proof device 100 may become bigger. On the other hand, if not enough windings are provided for the HVC 120, the operating range of shock proof device may become limited. For example, if a low $I_H$ is drawn by an external load, magnetic field B produced by the magnetic core 130 may not reach above the threshold magnetic field $B_T$ to cause the relay to switch from the default position to the energized position. Even if the relay switching occurs during an inrush period (e.g., a period immediately after turning on a motor-driven device during which a much larger than normal current flows through the motor windings) of the external electrical load (when $B \geq B_T$), the switch may become de-energized and revert back to the default state during a normal operation of the load when B may fall below $B_T$.

Figure 4:
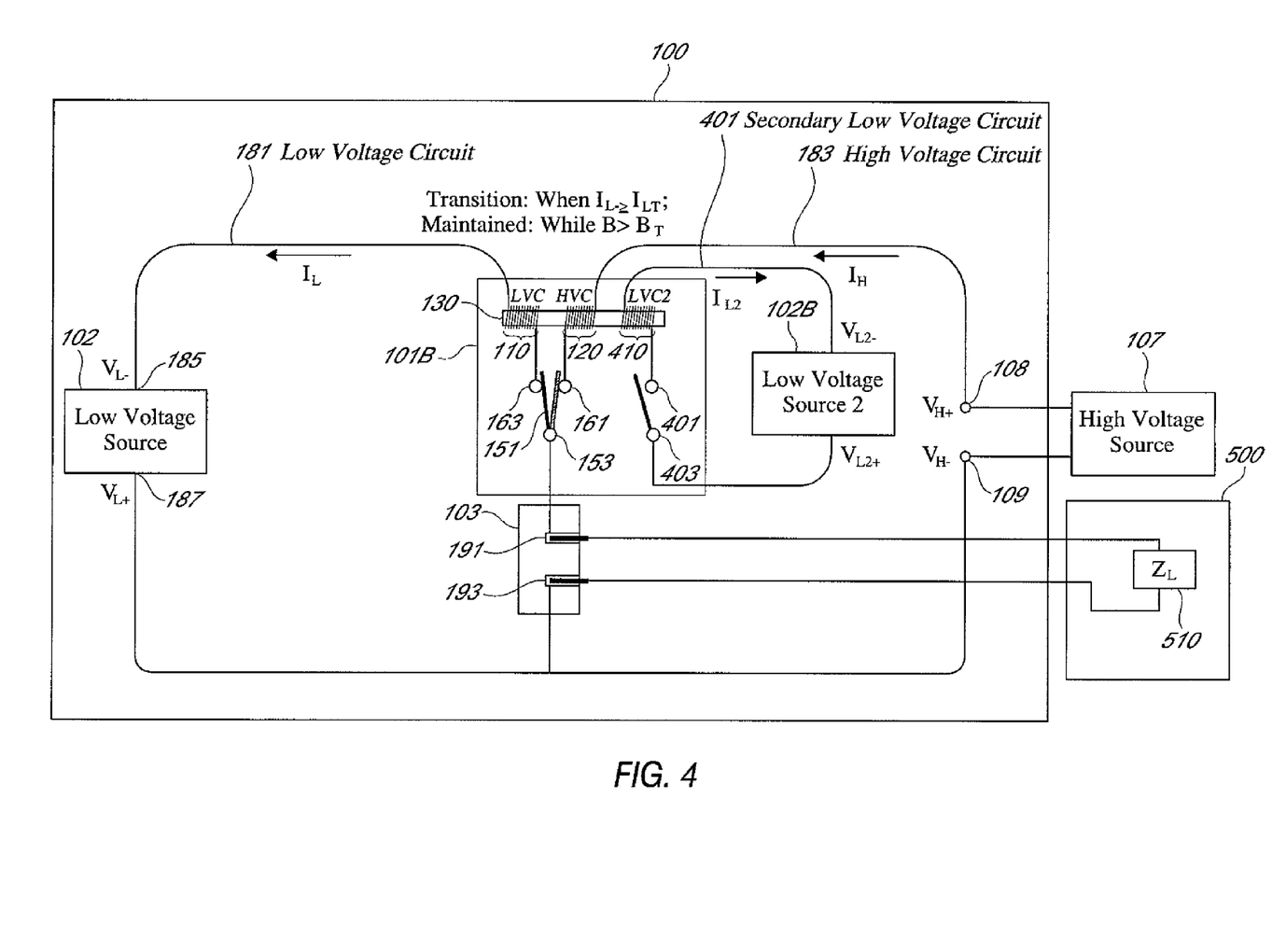
FIG. 4 shows a block diagram illustrating a low voltage assisted shock proof device according to certain embodiments.

One way to reduce or minimize $N_{HVC}$ without sacrificing the operation range of the shock proof device is to introduce a secondary low voltage (LV) circuit 401 as illustrated in FIG. 4. The low voltage (LV) assisted shock proof device 100B illustrated by FIG. 4 is similar to the shock proof device 100 illustrated by FIG. 1 except for the addition of the secondary LV circuit 401. The secondary LV circuit 401 comprises a second low voltage source 102B and a control relay 101B. In most cases, the second low voltage source 102B is the same as the low voltage source 102, but in some cases, they may be different. The control relay 102 B comprises, in addition to components described with respect to FIG. 1, a stationary assistive contact 401, a movable assistive contact 403, and a second low voltage coil (LVC2) 410.

The control relay 101B can be thought of as comprising two sets of switches: 1) a single-pole-double-throw (SPDT) switch comprising the common contact 153, the low voltage contact 163, and the high voltage contact 161; and 2) a single-pole-single-throw (SPST) switch comprising the stationary assistive contact 401 and the movable assistive contact 403. When the L-H switching condition ($I_L \geq I_{L-TH}$) is satisfied such that $B > B_T$, the SPDT and SPST switches simultaneously change state from their default positions to their energized positions, thereby energizing the HVC 120 and the LVC2 410. The energized HVC generates a first magnetic field $B_H$, and the energized LVC2 410 generates an assistive magnetic field $B_a$ that is added to the $B_H$ to produce the total magnetic field B:

$$B = B_H + B_a \qquad \text{Equation 1}$$

The secondary low voltage circuit 401 assists the high voltage circuit 183 by producing the assistive magnetic field Ba. In this sense, the shock proof device 100B will be henceforth referred to as the "low voltage assisted shock proof device." For the switches to remain in the energized states the total magnetic field B must be equal to or greater than a threshold magnetic field BT:

$$B \geq B_T \qquad \text{Equation 2}$$

Combining Eqs. (1) and (2) leads to the following relay maintenance condition:

$$B_H \geq B_T - B_a \qquad \text{Equation 3}$$

Therefore, the addition of the secondary low voltage circuit 401 reduces the field requirement for the HVC 120. For example, if $I_{L2}$ flowing through the LVC2 410 generates $B_a$ that is 80% of $B_T$, the HVC 120 only needs to generate 20% of the field it would have had to generate in absence of the secondary low voltage circuit 401. That reduction in the field requirement can translate into 80% reduction in the number of HVC 120 windings.

Figure 5:
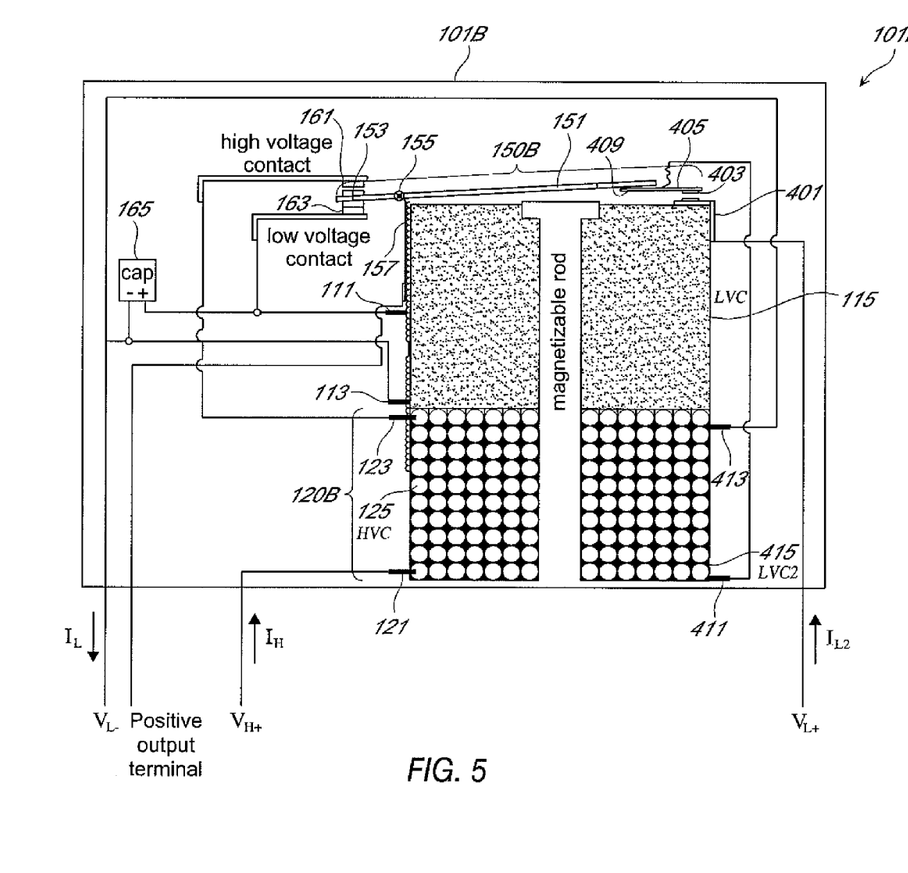
FIG. 5 shows a schematic diagram illustrating a low voltage (LV) assisted control relay 101B that can be used in a low voltage (LV) assisted shock control relay 100B such as the one illustrated by FIG. 4.

FIG. 5 shows a schematic diagram illustrating a low voltage (LV) assisted control relay 101B that can be used in a low voltage (LV) assisted shock control relay 100B such as the one illustrated by FIG. 4. The pivot is positioned on the left hand side so as to reduce the amount of magnetic field required to cause the rotation. Therefore, the LVC and the HVC can be made smaller. The LV assisted control relay 101B may include components that are included in the control relay 101 shown in FIG. 3. Accordingly, only certain features of the LV assisted control relay 101B will be described.

The LV assisted control relay 101B may comprise a dual contact lever system 150B in place of the lever system 150 described above with reference to FIG. 3. The dual contact lever system 150B includes, in addition to a common contact 153, a metallic strip 151, a pivot 155, and a support frame 157, an extended lever portion comprising a second metallic strip 405, and a movable assistive contact 403. The movable assistive contact 403 can be disposed at a second distal end of the lever system opposite to a first distal end where the common contact 153 is disposed. The extended lever portion can be joined to the rest of the dual contact lever system 150B via an insulating layer 409. Such a joint can be formed by, for example, epoxy-bonding the extended lever portion to the rest of the lever system 150B with a rubber piece inserted between the two as the insulating layer 409.

The LV assisted control relay 101B can also include a combined high voltage and low voltage coil (HLVC) 120B in place of the high voltage coil 120 shown in FIG. 3. The HLVC 120B can include two sets of coils HVC 120 and 410 (for example, see FIG. 4). As before, the HVC 120 comprises the HVC winding 125, the HVC input 121, and the HVC output 123. The LVC2 410 comprises a LVC2 winding 415, a LVC2 input 411, and a LVC2 output 413. In the embodiment shown, the LVC2 410 and the HVC 120 are wound together in such a way that the relatively thin LVC2 winding 415 fills the void created by the relatively thick HVC winding 125. This design minimizes the volume of the combined HLVC 120B. The LVC2 input 411 is electrically connected to the second metallic strip 405. The LVC2 output is electrically connected to $V_{L-}$ which is shared by the LVC output 113.

In operation, the LV assisted shock proof device 100B is connected to an external load, e.g., an appliance, such that the L–H switching condition ($I_L \geq I_{L-TH}$) is satisfied, the dual contact lever system 150B changes its state from the default state (shown in FIG. 4) to an energized state. In the energized state, the common contact 153 makes a mechanical and electrical contact with the high voltage contact 161. In the dual contact lever system 150B, however, the movable assistive contact 403 is brought into a mechanical and electrical contact with the stationary assistive contact 401, thereby completing the LVC2 410. The completion of the LVC2 causes the secondary low voltage current $I_{L2}$ to flow from the $V_{L+}$ to $V_{L-}$ through the LVC2 winding 415. As before, the delay capacitor 165 can prevent a mechanical oscillation during the relay switching. The assistive magnetic field $B_a$ generated by the flow of $I_{L2}$ in the LVC2 410 assists the magnetic field $B_H$ generated by the flow of $I_H$ in the HVC 120 in maintaining the dual contact lever 150B, and, therefore, the control relay 101B, in the energized state. Once the external load is removed, for example, turning off an "ON" switch on the external load or unplugging the load from the shock proof device, the HVC rapidly de-energizes, and the dual contact lever system 150B is released from its energized position to assume its default position.

In certain embodiments, the movable assistive contact is not disposed at the second distal end of the dual contact lever system 150B as shown in FIG. 5, but at somewhere between the first distal end and the second distal end. In some embodiments, the extended lever portion or section is formed, e.g., extruded, at the same time as the remaining section of the lever system 105B with an insulating barrier region electrically separating the two sections. In some embodiments, the LVC2 winding 415 is not wound with the HVC winding 125 so as to fill the void created by the HVC winding. Instead, the LVC2 winding is disposed inside the HVC winding. In other embodiments, the LVC2 winding 415 is disposed between the LVC winding 115 and the HVC winding 125. In yet other embodiments, the LVC2 winding 415 is disposed either inside or outside the LVC winding 115.

Shock Proof Device with Additional Safety Features

Figure 6:
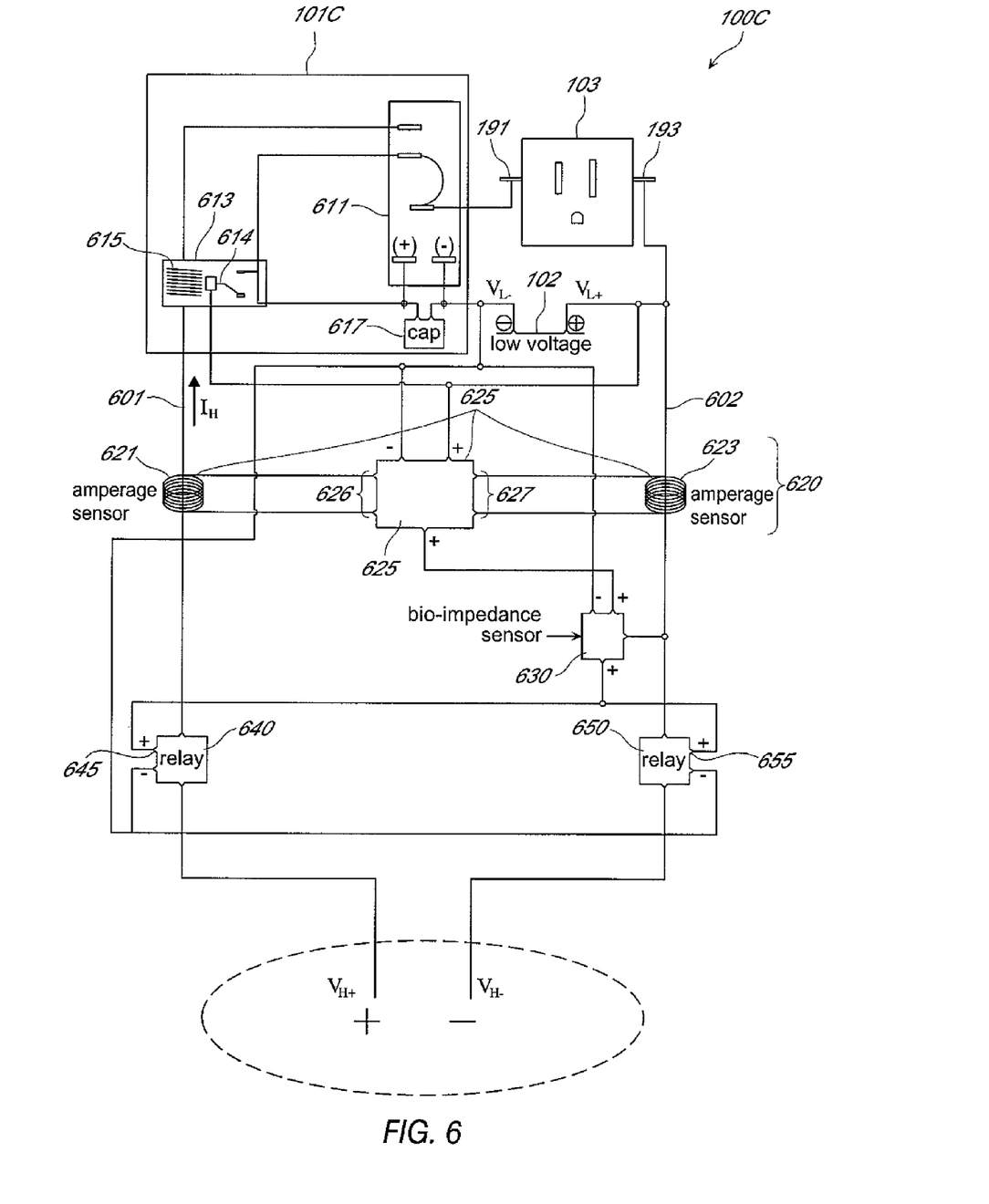
FIG. 6 shows a schematic diagram illustrating an electromechanical shock proof device that incorporates additional safety features that can prevent a shock caused by touching a live line when the shock proof device is energized.

FIG. 6 shows a schematic diagram illustrating an electromechanical shock proof device 100C that incorporates safety features that can prevent a shock caused by touching a live line when the shock proof device is energized. The electromechanical shock proof device 100C comprises a control relay 101C, a low voltage source 102, a power outlet 103 having a positive output terminal 191, and a negative output terminal 193. In the embodiments shown in FIG. 6, the control relay 103C comprises a standard electromechanical relay 611, a current sensing relay 613, and a delay capacitor 615. In the embodiment shown in FIG. 6, the electromechanical relay 611 includes a standard single-pole-double-throw (SPDT) relay with control inputs. However, in other embodiments, the control relay 101C can be the non LV assisted control relay 101 as shown in FIGS. 1-3 or the LV assisted control relay 101B as shown in FIGS. 4-5. In certain embodiments, the current sensing relay comprises a reed switch 614 and a coil 615 wound on the reed switch, where the coil 615 is made to carry the high voltage current $I_H$. When there is a sufficient $I_H$ flowing through the coil 615, the magnetic field generated by the coil actuates the reed switch 614. However, it will be appreciated that this is just one of many different ways to implement the current sensing relay 613.

The electromechanical shock proof device 100C can also include other safety elements including a balanced load detector 620, a bio-impedance sensor 630, a first in-line relay 640, and/or a second in-line relay 650. The balanced load detector 620 can comprise a first amperage sensor 621, a second amperage sensor 623, and a difference detector 625. The amperage sensors 621, 623, which are precisely matched to each other, are made to sense high voltage currents on live lines—the phase or hot line 601 carrying the $V_{H+}$ voltage and the grounded or neutral line 602 carrying the $V_{H-}$ voltage. The outputs of the amperage sensors 621, 623 are fed into two separate inputs 626, 627 of the difference detector 625. The difference detector 625 provides one (e.g., high) output when the currents in the hot line 601, and the neutral line 602 are matched and another (e.g., low) output when the currents are not matched, indicating a current leakage. The current leakage can be caused, for example, by a human or a pet touching one of the lines and drawing an extra current. The difference detector 625 can include a triode, a triac or any other bidirectional electronic switch which can conduct current in either direction when it is triggered (turned on). The bio-impedance sensor 630 is configured to sense electrical impedance presented by a living organism, e.g., a human or a dog. Such bio-impedance sensors can be implemented as touch sensors for use in a light switch or a computer keypad. The in-line relays 640, 650 are configured to close when a positive voltage is provided on the positive inputs 645, 655, and to open when no voltage is provided on the positive inputs.

Referring to FIG. 6, the start-up operation (e.g., energizing of the control relay when a load is first presented) of the live-line shock proof device 100C can be similar to that of the other shock proof devices 100, 100B described above. As with the control relays 101 and 101B shown in FIGS. 1-5, the negative (or neutral) low voltage $V_{L-}$ can be provided to the electromechanical relay 611. The low voltage current $I_L$ passes through the power outlet 103 across the output terminals 191, 193 when an external electrical load is plugged in and turned on. The low voltage current $I_L$ first reaches the common contact (the lowermost of the three contacts) of the electromechanical relay 611, from which it makes its way to the low voltage contact (the middle contact of the three contacts) and then to the delay capacitor 617, where the $I_L$ charges the delay capacitor. Soon after the delay capacitor 617 is charged, the current sensing relay 613 senses high voltage current $I_H$ flowing to the external electrical load, at which point the current sensing relay 613 switches, causing the delay capacitor 617 to discharge and energize the switching inputs (the contacts identified by the (+) and (−) symbols at the bottom of the main relay. This causes the existing contact between the common contact and the low voltage contact of the electromechanical relay to be broken and, in place of this connection, a contact is established between the common contact and the high voltage contact of the electromechanical relay. From this point on, high voltage ($V_{H+}$, $V_{H-}$) is supplied to the power outlet 103 until the external electrical load (not shown) is unplugged or turned off, at which time the switch 614 in the current sensing relay 613 opens up, which, in turn, causes the electromechanical relay 611 to return to its default state, namely, a low voltage configuration.

In addition to the basic functionalities of presenting high voltages to the power outlet only when it is connected to an external electrical load as described above, the electromechanical shock proof device 100C. can have additional safety features including detecting a human or a pet touching a live wire while the device 100C is energized. This additional safety feature is realized by one or a combination of leakage current detection provided by the balanced load detector 620 and human/pet sensing provided by the bio-impedance detector 630.

In absence of a current leakage somewhere in the high voltage circuit, a positive high voltage load current flowing to an electrical load through the hot line 601 should be the same as a negative load current flowing from the electrical load in the neutral line 602. Therefore, under the normal circumstances, the outputs of the matched amperage sensors 621, 623 are substantially the same, and the output of the difference detector 625 is high indicating the load currents are balanced. The high output of the difference detector 625 is provided to the input of the bio-impedance sensor 630, thereby causing its output to go high. However, if there is a current leakage caused by a component or a wire shorted to a ground or, more importantly, by a person or a pet touching a live wire (either the hot line or the neutral line), the outputs of the matched amperage sensors 621, 623 will no longer be the same, and the imbalance causes the output of the difference detector 625 to go low. The low output of the difference detector 625 causes the output of the bio-impedance sensor 630 to go low. This in turn causes the both in-line relays 640, 650 to open, thereby disconnecting the live high voltage lines from the power outlet 103.

It is worth noting that unlike conventional ground fault interrupt (GFI) devices, the balanced load detector shown in FIG. 6 does not require a reference to ground. Thus, if a person were to grab both or either of the negative and the positive high voltage live wires being monitored by the balance load detector 620, the difference detector element 625 would interpret the imbalance and no longer provide an output signal, thereby tripping the appropriate relay(s) and cutting off high voltage power.

In addition to the safety feature provided by the balanced load detector 620, the bio-impedance sensor 630 can detect a human or a pet touching a live line and trip the relays 640, 650. Thus, the bio-impedance sensor 630 can provide a redundancy to the live-line touch monitoring provided by the balanced load detector 620. In certain cases, the bio-impedance sensor 630 can provide a faster response time than the balanced load detector. Certain embodiments of the electro-mechanical shock proof device 100C include the balanced load detector 620, but not the bio-impedance sensor 630. Other embodiments include the bio-impedance sensor 630, but not the balanced load detector 620. Yet other embodiments include an additional bio-impedance sensor installed on the hot line 601 side. Yet other embodiments include the first in-line relay 640, but not the second in-line relay 650.

Various embodiments of shock proof devices described herein can have a plurality of applications including, but not limited to, light switches (3-way and dimmer), plug strips (and plug molds), circuit breakers, wall plug-in overlays, machineries, generators, arc welders, leakage preventions in cars and houses, extension cord adaptors (male and female, integral), light bulb socket adaptor, screw-in fuses/breakers, and tract lighting. For example, when applied to the arc welders, the shock proof device can prevent an electrical shock as well as unnecessary current draw by the arc welder when the arc welding is not taking place (when the welding rod is not touching the work piece.)

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A device for preventing an electric shock, the device comprising:
    output terminals for connecting to an external load;
    a low voltage circuit for carrying a first current ($I_L$) to the output terminals, the low voltage circuit comprising a first coil disposed about a magnetic core;
    a high voltage circuit for carrying a second current ($I_H$) to the output terminals, the high voltage circuit comprising a second coil disposed about the magnetic core; and
    a control relay configured to electrically connect the output terminals to only one of the high voltage circuit and the low voltage circuit based at least partly on the first current ($I_L$),
    wherein the control relay includes a default state and an energized state, and wherein the low voltage circuit is connected to the output terminals in the default state and the high voltage circuit is connected to the output terminals in the energized state, wherein the control relay is configured to switch from the default state to the energized state when a magnetic field produced by the magnetic core due to the $I_L$ current flowing in the first coil equals or exceeds a threshold magnetic field, and wherein the control relay remains in the energized state while a magnetic field produced by the magnetic core due to the $I_H$ current flowing in the second coil equals to or exceeds a threshold magnetic field.

2. The device of claim 1, wherein the magnetic field exceeds the threshold magnetic field when the magnitude of the $I_L$ current equals to or exceeds a low voltage current threshold value.

3. The device of claim 1, further comprising a second low voltage circuit configured to carry a third current $I_H$ and provide an assistive magnetic field that is added to the magnetic field due to the $I_H$ current.

4. A device for preventing an electric shock, the device comprising:
    a low voltage source;
    high voltage input terminals for connecting to a high voltage source;
    a power outlet comprising a pair of output terminals for providing either a low voltage current ($I_L$) or a high voltage current ($I_H$) to an external electrical load; and
    a control relay for selectively providing power from one of the low voltage source and the high voltage source to the power outlet, wherein the control relay comprises a low voltage coil configured to carry the $I_L$ current and a high voltage coil configured to carry the $I_H$ current,
    wherein the control relay includes a default state and an energized state, wherein low voltage is provided in the default state and high voltage is provided in the energized state, and wherein the control relay remains in the energized state while a magnetic field produced by the magnetic core due to the $I_H$ current flowing in the high voltage coil equals to or exceeds a threshold magnetic field.

5. The device of claim 4, wherein the control relay switches from the default state to the energized state when a magnetic field produced by the magnetic core due to the $I_L$ current flowing in the low voltage coil equals or exceeds a threshold magnetic field.

6. The device of claim 5, wherein the magnetic field exceeds the threshold magnetic field when the magnitude of the $I_L$ current equals to or exceeds a low voltage current threshold value.

7. The device of claim 4, wherein the control relay switches from the default state to the energized state when an external electrical load having a load impedance ($Z_L$) that is less than a threshold impedance is connected to the power outlet.

8. The device of claim 7, wherein the threshold impedance is between about 500Ω and about 10 kΩ.

9. The device of claim 7, wherein the threshold impedance is between about 10 kΩ and about 100 kΩ.

10. The device of claim 4, wherein the control relay further comprises:
a magnetic core that is disposed within the high voltage coil and the low voltage coil;
a lever system comprising
a support frame disposed with respect to at least one of the low voltage coil and the high voltage coil,
a pivot connected to the support frame,
a metallic strip rotatably connected to the pivot, the metallic strip having a first side and a second side, and
a common contact disposed on the metallic strip;
a high voltage contact disposed on the first side of the metallic strip; and
a low voltage contact disposed on the second side of the metallic strip.

11. The device of claim 10, wherein the magnetic core comprises a soft magnetic material.

12. The device of claim 10, wherein the metallic strip is a bimetallic strip that is configured to convert a temperature change into a mechanical displacement.

13. The device of claim 10, wherein the pivot comprises a spring that is configured to apply a torque on the metallic strip such that the common contact makes an electrical contact with the low voltage contact in the default state.

14. The device of claim 13, wherein a switching from the default state to the energized state occurs when a magnetic field produced the magnetic core due to the $I_L$ current flowing in the low voltage coil exerts an attractive force between the magnetic core and the metallic strip strong enough to overcome the torque provided by the spring.

15. The device of claim 10, further comprising a secondary low voltage coil that is configured to carry a secondary low voltage current and provide an assistive magnetic field that is added to a magnetic field due to the $I_H$ current.

* * * * *